3,156,457
SINUOUS WIRE SEAT SPRING

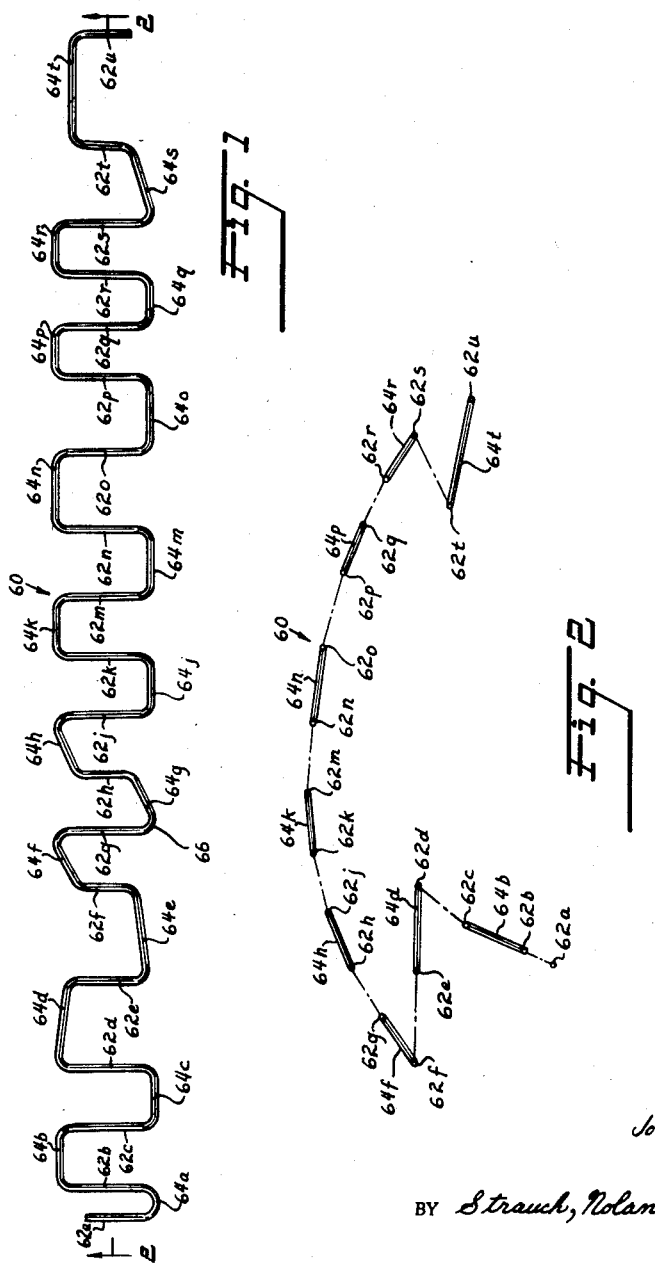

John C. Hampson, Holland, Mich., assignor to Rockwell-Standard Corporation, Coraopolis, Pa., a corporation of Pennsylvania
Original application June 12, 1956, Ser. No. 590,926, now Patent No. 3,057,380, dated Oct. 9, 1962. Divided and this application Apr. 30, 1962, Ser. No. 191,170
1 Claim. (Cl. 267—1)

This invention relates to a sinuous wire seat spring and particularly to a formed spring of this type bent from a single length of spring wire wherein the original wire diameter is maintained in the formed strip.

This is a division of my copending application Serial No. 590,926, filed June 12, 1956, now Patent No. 3,057,380, which discloses and claims apparatus for forming the spring of the present invention.

Spring strips of the general type contemplated by the invention have been proposed but all of them contain stretched, work hardened and/or reduced diameter sections which result in poor spring performance as when incorporated into automobile seats.

It is the major object of the present invention to provide a novel sinuous wire seat spring of special construction and uniform wire diameter throughout.

A further object of the invention is to provide a novel formed sinuous seat spring of the multiple torsion bar multiple spacer bar type which after forming has a substantially uniform wire diameter equal to the diameter of the wire from which it formed and which is substantially free of internal stresses.

A further object of the invention is to provide a novel sinuous wire seat spring having a series of laterally oppositely open loops along its length, the sides of each loop consisting essentially of two parallel torsion bars, and the closed end of each loop being a permanently straight generally longitudinally extending spacer bar, with the wire being of uniform diameter and substantially unstretched throughout its entire length.

Further objects of the invention will presently appear as the description proceeds in connection with the appended claim and the drawing herein wherein:

FIGURE 1 is a plan view of a flat sinuous wire spring strip according to a preferred embodiment of the invention; and FIGURE 2 is an essentially diagrammatic side elevation along line 2—2 of FIGURE 1 showing the flat strip of FIGURE 1 as it may be bent longitudinally in strip form into a suitable condition to serve in an automobile seat.

Spring strip 60, shown flat in FIGURE 1, is formed from a single length of spring wire which has been suitably folded into sinuous form to provide torsion bars 62–a through 62–u extending at substantially right angles transversely of the length of spring strip 60 and interconnected at alternate ends by spacer bars 64–a to 64–t.

As therein illustrated, the torsion bars 62–a through u and the spacer bars 64–a through 64–t are of varying lengths to provide the desired degree of strength and spring action of the spring strip 60 at various regions along its length between torsion bars 62–a and 62–u.

Spring strip 60 is of particularly novel construction in that the diameter of the wire 66 of which the spring strip 60 is formed is retained in the formed spring strip 60 throughout its entire length after the spring 60 has been fabricated into the form illustrated in FIGURE 1.

That is, at any point along the spring strip 60 from the end of torsion bar 62–a to the end of torsion bar 62–u, the wire 66 is of uniform diameter within a tolerance of plus or minus .002 inch regardless of absolute diameter of the various wire sizes used for this type of automobile seat spring even in the curved portions interconnecting the ends of spacer bars 64 with the ends of torsion bars 62, and is the same as that of the straight wire from which the spring strip was formed.

It will be observed that the torsion bars 62 are all straight and perpendicular to the longitudinal axis of the formed seat spring, and that all of the spacer bars 62 are straight and lie on opposite sides of that longitudinal axis. The torsion bars are formed by oppositely turning longitudinally spaced portions along the length of a straight wire until the portions are parallel. While holding these portions, which are the torsion bars 62 in the strip of FIGURE 1, parallel the bent portions of wire extending between the ends of the parallel portions are forcibly straightened permanently, as by a hammer action, so that when the formed spring is released these straightened portions do not tend to regain their bent condition and they retain the torsion bars in spaced parallelism. This parallelism is retained in the strip form shown in FIGURE 2 wherein the various longitudinal junctures occur on the axes of the torsion bars.

As shown in FIGURE 2 the intermediate portion of the final formed strip is arched while the opposite ends are bent about respective torsion bars to form oppositely outwardly open V-structures.

The V-structure at the left side of FIGURE 2 is formed by bending that end of the formed sinuous strip of FIGURE 1 counterclockwise about the axis of torsion bar 62f and then bending the terminal portion clockwise about the axis of torsion bar 62d. It will be noted that torsion bar 62d at the apex of this left hand V-structure is full length, and that the sides of this V-structure each comprise two spacer and torsion bar sections.

The V-structure at the right end of FIGURE 2 is formed by bending that end of the preformed sinuous strip of FIGURE 1 clockwise about the axis of torsion bar 62–s and bending the terminal portion counterclockwise about the axis of torsion bar 62–t.

An apparatus for forming this strip is disclosed in said Serial No. 590,926, and I have filed a divisional application disclosing and claiming a method of forming this strip as a further division of said Serial No. 590,926.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by Letters Patent is:

A sinuous strip wire seat spring formed from a single length of spring wire of original predetermined uniform diameter and consisting of a series of loops with alternate loops open laterally oppositely in the seat spring, said loops each consisting of parallel side bars serving as torsion bars in the seat spring and extending at right angles to the longitudinal axis of said seat spring with the closed ends of said loops being straight spacer bars, the wire of said formed seat spring being substantially unstretched axially and of the same uniform diameter as originally in the unformed length of wire, and the formed sinuous strip being bent about the axes of selected torsion bars to provide at opposite ends oppositely outwardly open V-structures, the V-structure at one end having a full length torsion bar at its apex and each side of said one said V-structure comprising two spacer and torsion bar sections with the spacer bars in the terminal side of said one V-structure being shorter than the spacer bars in the other side thereof, and there being an intermediate arched portion of said formed sinuous strip extending between said V-structures, the end section of said arched portion that is connected to said one V-structure comprising a torsion bar connected at opposite ends to shorter torsion bars by spacer bars that are similarly inclined to the longitudinal axis of the spring.

References Cited in the file of this patent
UNITED STATES PATENTS

| | | |
|---|---|---|
| 2,684,844 | Flint et al. | July 27, 1954 |
| 2,859,802 | Asaro | Nov. 11, 1958 |
| 2,886,311 | Flint | May 12, 1959 |